United States Patent
Fowler et al.

(10) Patent No.: US 10,993,412 B2
(45) Date of Patent: May 4, 2021

(54) PRESSURE REGULATOR

(71) Applicant: Valeo Companies, Inc., New Holland, PA (US)

(72) Inventors: Amos Glen Fowler, Denver, PA (US); Philip E. Risser, Leola, PA (US); Daniel B. Truong, Lancaster, PA (US); Malachi E. Seilhamer, Harrisburg, PA (US)

(73) Assignee: Valco Industries, Inc., New Holland, PA (US)

( * ) Notice: Subject to any disclaimer, the term of this patent is extended or adjusted under 35 U.S.C. 154(b) by 83 days.

(21) Appl. No.: 16/253,816

(22) Filed: Jan. 22, 2019

(65) Prior Publication Data

US 2019/0223407 A1 Jul. 25, 2019

Related U.S. Application Data

(60) Provisional application No. 62/619,946, filed on Jan. 22, 2018.

(51) Int. Cl.
*A01K 7/02* (2006.01)
*B05B 1/30* (2006.01)
(Continued)

(52) U.S. Cl.
CPC .............. *A01K 7/02* (2013.01); *B05B 1/3013* (2013.01); *B05B 3/021* (2013.01); *B05B 12/085* (2013.01);
(Continued)

(58) Field of Classification Search
CPC ........... Y10T 137/783; Y10T 137/7796; Y10T 137/7797; A01K 7/02; G05D 16/0652;
(Continued)

(56) References Cited

U.S. PATENT DOCUMENTS 17,317 A * 5/1857 Cornelius .............. G05D 16/10
137/505.13
530,200 A * 12/1894 Olson ................... F16K 27/045
137/270
(Continued)

FOREIGN PATENT DOCUMENTS

JP 2011-232009 A 11/2011

OTHER PUBLICATIONS

International Search Report and Written Opinion dated Apr. 29, 2019 in corresponding PCT Application No. PCT/US19/014528.

*Primary Examiner* — Jessica Cahill
(74) *Attorney, Agent, or Firm* — Duane Morris LLP

(57) ABSTRACT

A pressure regulator for controlling flow of a fluid therethrough is provided. An upper housing member and a primary diaphragm define an upper chamber and a lower housing member and the primary diaphragm define a lower chamber. The pressure regulator further includes: a valve assembly provided within the upper chamber for controlling the flow of the fluid from an inlet body into the upper chamber; a secondary diaphragm provided within the lower chamber and defining a secondary diaphragm driving chamber; and a passageway connecting the inlet body and the secondary diaphragm driving chamber. During operation, the secondary diaphragm driving chamber is filled with the fluid at the inlet pressure, thereby subjecting the secondary diaphragm to the inlet pressure and generating the force for actuating the valve's disengagement from the inlet body. The pressure regulator functions to maintain the outlet pressure at a value that is a predetermined fraction of the inlet pressure.

20 Claims, 8 Drawing Sheets

(51) Int. Cl.
  *B05B 3/02* (2006.01)
  *B05B 12/08* (2006.01)
  *G05D 16/06* (2006.01)

(52) U.S. Cl.
  CPC .... *B05B 12/088* (2013.01); *F17C 2205/0338* (2013.01); *F17C 2205/0388* (2013.01); *G05D 16/0608* (2013.01); *Y10T 137/7796* (2015.04); *Y10T 137/7797* (2015.04); *Y10T 137/783* (2015.04)

(58) Field of Classification Search
  CPC ............ G05D 16/0672; G05D 16/0697; B05B 1/3013; B05B 3/021; B05B 12/085; B05B 12/088; F17C 2205/0338; F17C 2205/0388
  See application file for complete search history.

(56) References Cited

U.S. PATENT DOCUMENTS

| | | | | |
|---|---|---|---|---|
| 2,692,612 A * | 10/1954 | Drane | ................ | G05D 16/0672 137/510 |
| 2,693,823 A * | 11/1954 | Sogge | ................ | G05D 16/0672 137/614.21 |
| 2,761,464 A * | 9/1956 | Faust | ................ | G05D 16/0672 137/116.5 |
| 2,775,981 A * | 1/1957 | Zonker | ................ | F02M 21/00 137/505.12 |
| 3,545,471 A * | 12/1970 | Taplin | ................ | G05D 16/0641 137/116.5 |
| 4,991,621 A * | 2/1991 | Steadier, Jr. | ........ | G05D 16/0683 137/505.46 |
| 5,218,991 A * | 6/1993 | Gray | ................ | G05D 16/185 137/312 |
| 5,765,588 A | 6/1998 | Katz | | |
| 6,253,708 B1 | 7/2001 | Johnson | | |
| 6,776,180 B1 * | 8/2004 | Yonnet | ................ | G05D 16/2095 137/14 |
| 8,869,827 B2 * | 10/2014 | Yamauchi | ............ | G05D 16/0669 137/505.13 |
| 8,967,180 B2 * | 3/2015 | Yamauchi | ................ | F16K 17/06 137/116.3 |
| 2003/0111019 A1 * | 6/2003 | Pollock | ................ | A01K 39/0213 119/72 |
| 2004/0149231 A1 | 8/2004 | Pollock | | |
| 2004/0261859 A1 * | 12/2004 | Callies | ................ | F16K 17/0413 137/495 |
| 2006/0096640 A1 | 5/2006 | Pollock et al. | | |
| 2012/0285390 A1 | 11/2012 | Katz et al. | | |
| 2013/0074956 A1 * | 3/2013 | Okitsu | ................ | G05D 16/0672 137/505 |
| 2014/0190580 A1 | 7/2014 | Roes | | |
| 2017/0042127 A1 | 2/2017 | Katz et al. | | |
| 2018/0156347 A1 * | 6/2018 | Bishoff | ................ | F16K 17/044 |

\* cited by examiner

PRESSURE REGULATOR

CROSS-REFERENCE TO RELATED APPLICATIONS

This application claims priority under 35 U.S.C. § 119(e) to U.S. Provisional Application No. 62/619,946, filed Jan. 22, 2018, the entire contents of which are incorporated herein by reference.

FIELD

The invention generally relates to the field of pressure regulators, and more specifically to differential pressure regulators.

BACKGROUND

Pressure regulators are used to control the outlet pressure of a fluid flowing through the regulator. In traditional pressure regulators, the outlet pressure is adjusted by varying the force applied to a diaphragm within the housing of the pressure regulator. In some pressure regulators, the force on the diaphragm is applied by a coil spring. To adjust the force, and thereby the outlet pressure, the user must physically adjust the regulator to change the force applied by the coil spring.

This physical adjustment may become burdensome, particularly in environments in which the pressure regulator is difficult to access or when a number of pressure regulators are present, each requiring adjustment. This is the case, for example, in water supply lines used to supply water and other fluids to poultry and other animals. An improved pressure regulator, in which adjustment of the outlet pressure is simplified, is therefore desired.

SUMMARY

One embodiment of a pressure regulator for controlling flow of a fluid therethrough includes a housing having an upper housing member and a lower housing member, and a primary diaphragm secured between the upper housing member and the lower housing member. The upper housing member and the primary diaphragm define an upper chamber and the lower housing member and the primary diaphragm define a lower chamber. The upper housing member further comprises an inlet body for allowing the fluid from a fluid source to flow into the upper chamber, and a first outlet for allowing the fluid to flow out of the upper chamber. Additionally, the inlet body has an inlet (i.e., an opening) in the upper housing. The pressure regulator further includes a valve assembly provided within the upper chamber configured with a valve engaging the inlet for controlling the flow of the fluid from the inlet body into the upper chamber. The valve is connected to the primary diaphragm for actuating the valve's disengagement with the inlet. When the pressure regulator is in operation, the fluid in the inlet body upstream from the valve is at an inlet pressure, the inlet pressure applying a force acting on the valve to keep the valve open, and the fluid in the upper chamber is at an outlet pressure. The pressure regulator also includes a secondary diaphragm provided within the lower chamber and defining a secondary diaphragm driving chamber between the secondary diaphragm and the lower housing member within the lower chamber. The secondary diaphragm is configured and adapted for acting on the primary diaphragm and producing a force for actuating the valve's engagement with the inlet body. The pressure regulator also includes a passageway connecting the inlet body and the secondary diaphragm driving chamber. The passageway is connected to the inlet body at a point upstream from the valve, thereby providing a fluid communication between the inlet body and the secondary diaphragm driving chamber. The provision of the passageway allows the secondary diaphragm driving chamber to be filled with the fluid at the inlet pressure. As a result, during operation of the pressure regulator, the secondary diaphragm is subjected to the inlet pressure and thereby generates the force for actuating the valve's disengagement from the inlet body. When the fluid is flowing through the upper chamber and out through the first outlet, the outlet pressure is at a value that is a predetermined fraction of the inlet pressure.

In some embodiments, the pressure regulator also includes a primary diaphragm driving piston provided within the lower chamber and positioned for acting on the primary diaphragm, which produces the force for actuating the valve's engagement with the inlet body. In such embodiments, the primary diaphragm driving piston is positioned between the primary diaphragm and the secondary diaphragm. The secondary diaphragm thereby acts on the primary diaphragm driving piston which in turn produces the force for actuating the valve's disengagement from the inlet body. During operation of the pressure regulator, the secondary diaphragm driving chamber is filled with the fluid at the inlet pressure. As a result, the secondary diaphragm is subjected to the inlet pressure and thereby generates a force acting on the primary diaphragm driving piston. The primary diaphragm driving piston is configured to apply a pressure on the primary diaphragm for producing the force for actuating the valve's disengagement from the inlet body for controlling the flow of the fluid from the inlet body to the upper chamber.

In some embodiments, the valve has an effective area that is exposed to the inlet pressure which produces a force acting on the valve to keep the valve open. Additionally, the secondary diaphragm has an effective surface area exposed to the inlet pressure which produces a force acting on the primary diaphragm driving piston. The primary diaphragm has an effective surface area exposed to the outlet pressure, which produces a force opposing the secondary diaphragm's force acting on the primary diaphragm driving piston.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENTS

Figure 1A:
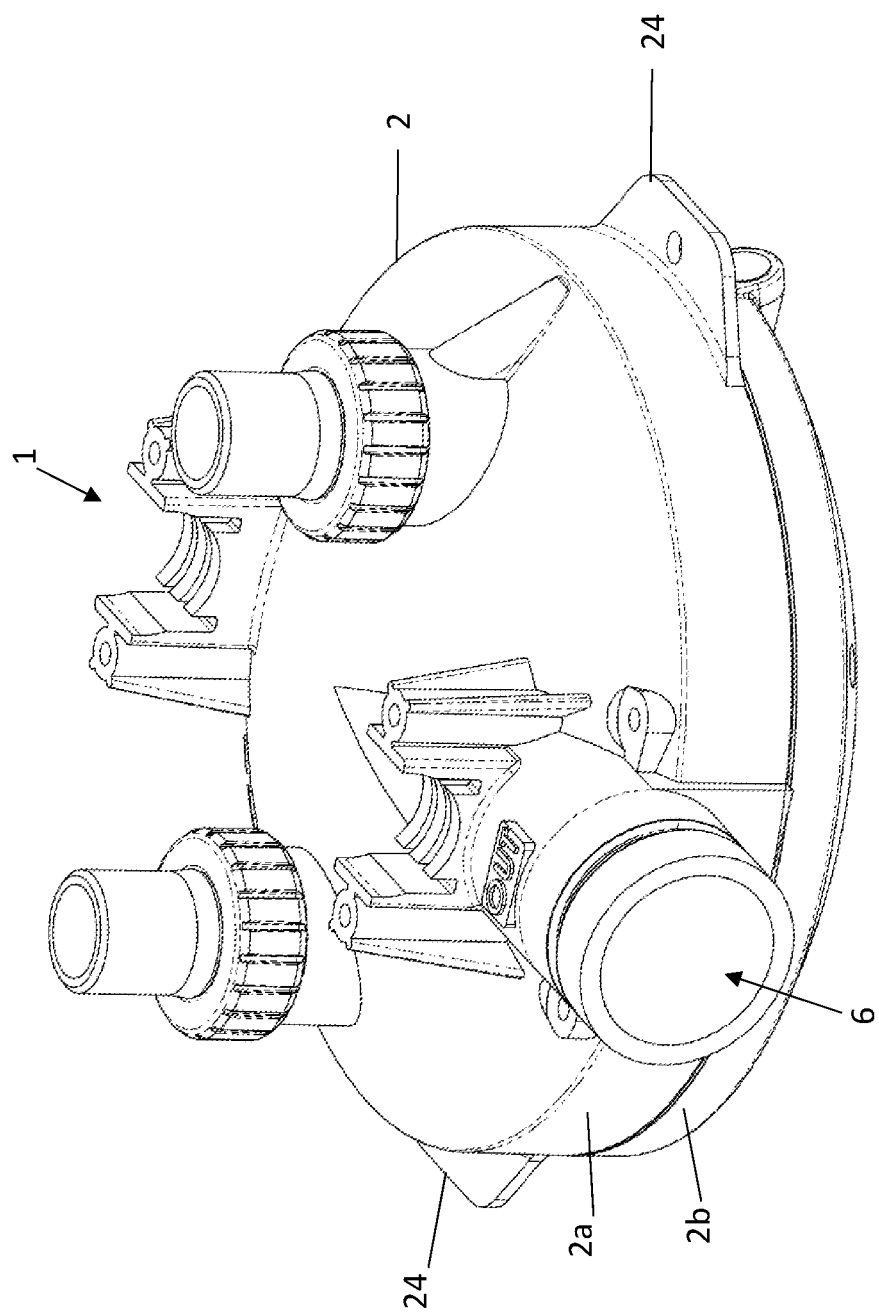
FIG. 1A is an external isometric view of a pressure regulator according to at least one embodiment of the present disclosure.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

The present disclosure describes a pressure regulator in which the outlet pressure is a predetermined fraction of the inlet pressure. The pressure regulators of the present disclosure respond to both changes in downstream load as well as changes in inlet pressure. For example, for a particular inlet pressure, the pressure regulator will automatically adjust the inflow to maintain a constant outlet pressure in response to downstream load changes. In contrast to traditional pressure regulators, this outlet pressure is automatically adjusted in response to changes in inlet pressure. These pressure regulators are particularly well-suited for the delivery of water or other fluids in a drip-feeding system for poultry and other animals. Such pressure regulators allow for the outlet pressure to be adjusted to a desired value by simply adjusting the inlet pressure. As a result, the pressure regulator does not need to be physically accessed in order to adjust the outlet pressure. This offers significant advantages in situations in which the pressure regulator is in a difficult to access location or in situations in which a number of pressure regulators are dispersed throughout a facility, such as in a factory setting. For example, multiple pressure regulators of the present disclosure may be connected in parallel to a single inlet source. By adjusting the pressure of the inlet source, each of the downstream pressure regulators would be automatically adjusted to the desired outlet pressure. Because of these, and other, advantages, the pressure regulators disclosed herein can simplify operation and reduce operating costs for users.

The differential pressure regulator described herein uses a primary diaphragm and a secondary diaphragm to control the flow through an intake. The effective areas of the primary diaphragm, the secondary diaphragm, and the inlet body are configured such that the pressure at the outlet of the regulator is a predefined fraction of the pressure at the inlet body. The relative effective areas of the diaphragms can be configured, during design and manufacture, to achieve a desired relationship between the inlet pressure and the outlet pressure. Because the inaccuracies of spring effect and other mechanical factors are eliminated, the pressure regulators of the present disclosure can also minimize the "droop," or the difference between the desired outlet pressure and the actual outlet pressure. This allows these pressure regulators to be used over a range of pressures.

Figure 1B:
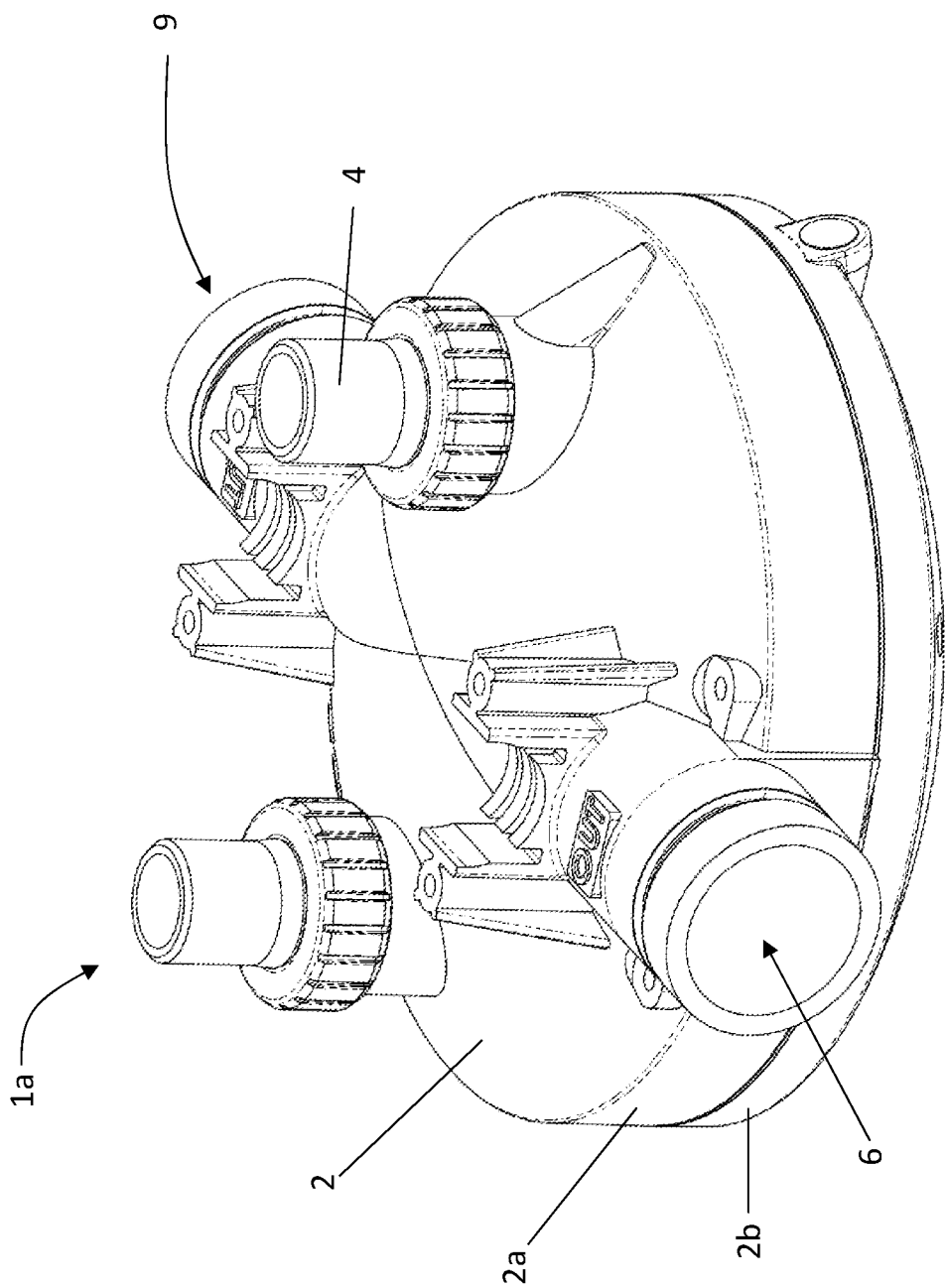
FIG. 1B is an external isometric view of a pressure regulator according to another embodiment of the present disclosure.
Figure 1C:
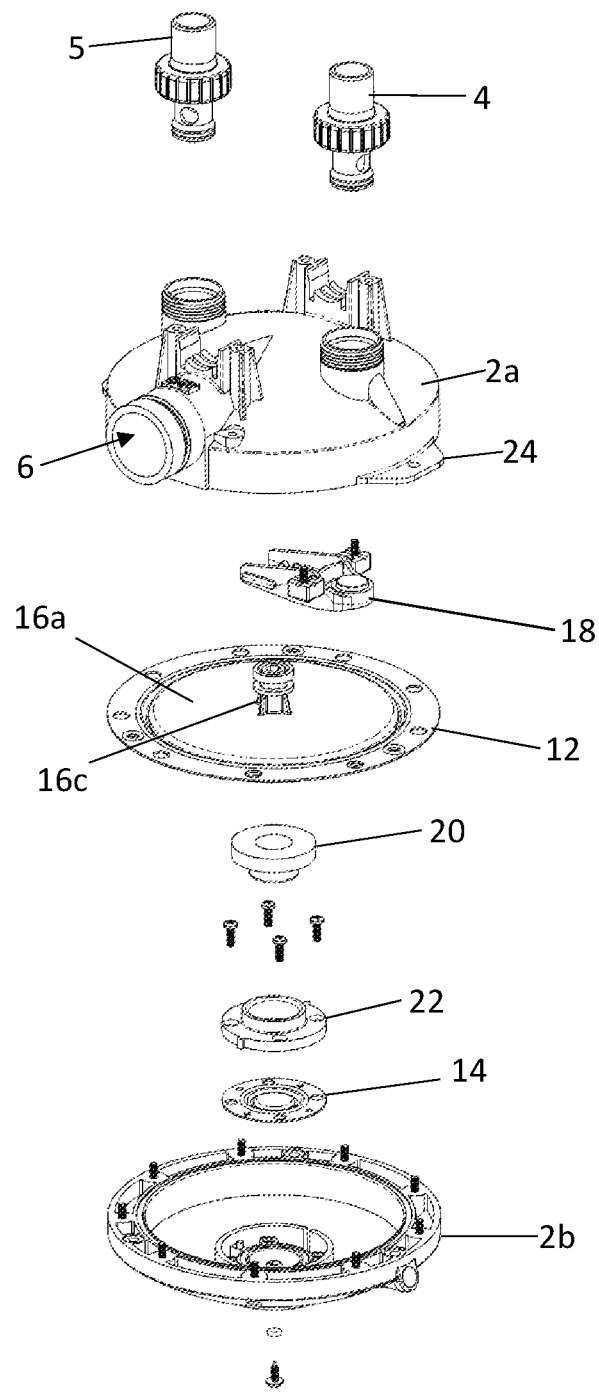
FIG. 1C is an exploded view of the pressure regulator of FIG. 1A.
Figure 2:
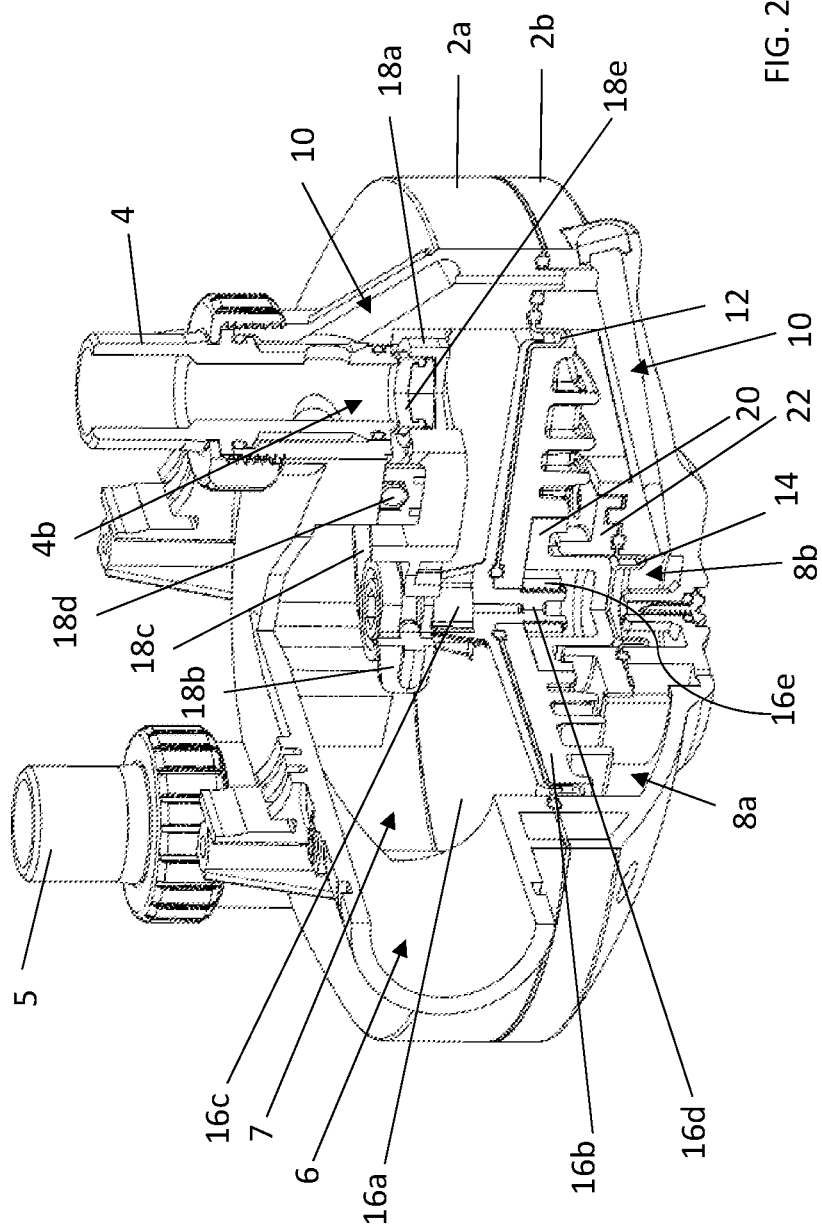
FIG. 2 is a partial cross-sectional isometric view of the pressure regulator of the embodiments shown in FIGS. 1A and 1B.
Figure 3:
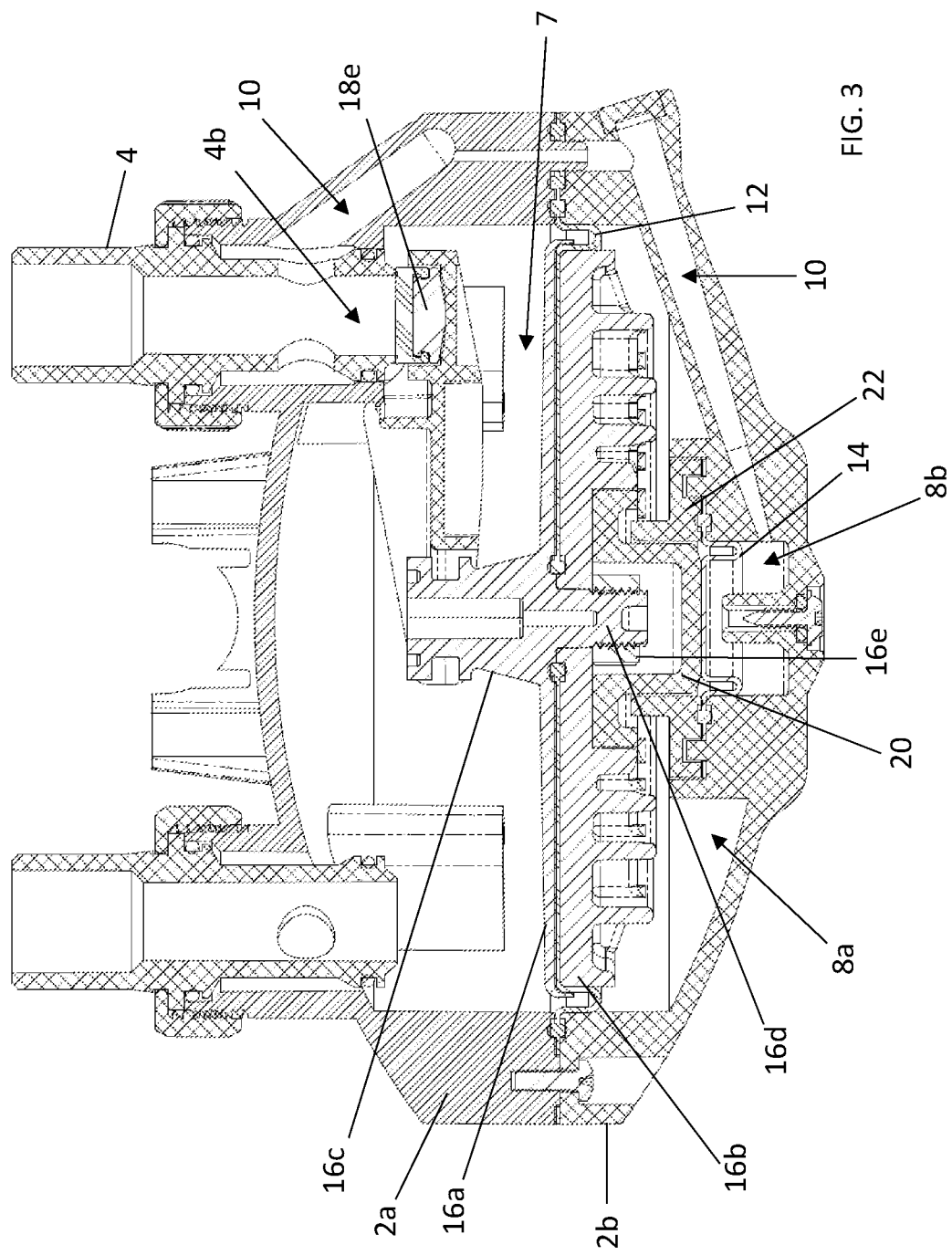
FIG. 3 is a cross-sectional side view of the pressure regulator of the embodiments shown in FIGS. 1A and 1B.

In one embodiment of the present invention, as shown in FIGS. 1-3, a pressure regulator 1 controls the flow of a fluid therethrough. As shown in FIG. 1, the pressure regulator 1 includes a housing 2 which includes an upper housing member 2a and a lower housing member 2b. The upper housing member 2a also includes an inlet body 4 and a first outlet 6. The inlet body 4 has an inlet 4b in the upper housing member 2a. In some embodiments, the housing 2 can also include connecting flanges 24 for removably coupling the pressure regulator 1 to a structure As shown in FIG. 1B, in some embodiments, a pressure regulator 1a has a second outlet 9. This allows the pressure regulator 1a to be mounted to multiple outlet lines, as will be described in further detail herein, specifically with respect to FIG. 5. In other aspects, the pressure regulator 1 shown in FIG. 1A and the pressure regulator 1a shown in FIG. 1B operate in the same manner and the description provided herein applies to both embodiments.

As best seen in FIGS. 1C, 2, and 3, the pressure regulator 1 further includes a primary diaphragm 12 secured between the upper housing member 2a and the lower housing member 2b. The upper housing member 2a and the primary diaphragm 12 define an upper chamber 7. The lower housing member 2b and primary diaphragm 12 define a lower chamber 8a. The inlet body 4 allows the fluid from a fluid source to flow into the upper chamber 7. The first outlet 6 allows fluid to flow out of the upper chamber 7. In the embodiment shown in FIG. 1B, the fluid flows out of both the first outlet 6 and the second outlet 9. A valve assembly 18, provided within the upper chamber 7, is configured with a valve 18e that engages the inlet 4b for controlling the flow of the fluid from the inlet body 4 into the upper chamber 7. This is sometimes known in the art as a "restricting element." The valve 18e is connected to the primary diaphragm 12 for actuating the valve's engagement with the inlet 4b. When the pressure regulator 1 is in operation, the fluid in the inlet body 4 upstream from the valve 18e is at an inlet pressure, the inlet pressure applies a force acting on the valve 18e to keep the valve 18e open to allow the flow of fluid into the upper chamber 7. The fluid in the upper chamber 7 is at an outlet pressure.

The pressure regulator 1 also includes a secondary diaphragm 14 provided within the lower chamber 8a. The secondary diaphragm 14 defines a secondary diaphragm driving chamber 8b, within the lower chamber 8a, between the secondary diaphragm 14 and the lower housing member 2b. The secondary diaphragm 14 is configured and adapted for acting on the primary diaphragm 12 to produce a force for actuating the disengagement of the valve 18e from the inlet body 4 and thus the inlet 4b. The secondary diaphragm 14 is secured in position between the lower housing member 2b and a locking plate 22 (shown, for example, in FIGS. 1C and 3). One or more fasteners (e.g., screws or bolts) may be used to couple the locking plate 22 to the lower housing member 2b to sandwich the secondary diaphragm 14 and, thereby, secure the secondary diaphragm 14 in position.

The pressure regulator 1 also includes a passageway 10 connecting the inlet body 4 and the secondary diaphragm driving chamber 8b. The passageway 10 is connected to the inlet body 4 at a point upstream from the valve 18e, thereby providing a fluid communication between the inlet body 4 and the secondary diaphragm driving chamber 8b. The passageway 10 can be a channel formed in the housing 2. A portion of the channel can be formed in the upper housing member 2a or the lower housing member 2b. In some embodiments, each of the upper and lower housing members include a channel that is in fluid communication with that of the other housing member. The passageway 10 can, in some embodiments, include a restrictor that controls the flow in the inlet body into the secondary diaphragm driving chamber 8b. The restrictor can be used to modify the response rate of the pressure regulator.

During operation of the pressure regulator 1, the secondary diaphragm driving chamber 8b is filled with the fluid at the inlet pressure, whereby the secondary diaphragm 14 is subjected to the inlet pressure, thereby generating the force for actuating the disengagement of the valve 18e from the inlet body 4. When the fluid is flowing through the upper chamber 7 and out through the first outlet 6, the outlet pressure is at a value that is a predetermined fraction of the inlet pressure. In the pressure regulator 1a shown in FIG. 1B, fluid flows through both the first outlet 6 and the second outlet 9 at the outlet pressure.

The pressure regulator 1 can further include a primary diaphragm driving piston 20 provided within the lower chamber 8a and positioned between the primary diaphragm 12 and the secondary diaphragm 14. The secondary diaphragm 14 thereby acts on the primary diaphragm driving piston 20 that in turn acts on the primary diaphragm 12, thereby producing the force for actuating the disengagement of the valve 18e from the inlet body 4. The secondary diaphragm driving chamber 8b is positioned underneath the primary diaphragm driving piston 20. The secondary diaphragm 14 is positioned between the primary diaphragm driving piston 20 and the secondary diaphragm driving chamber 8b and acts on the primary diaphragm driving piston 20 to produce the force for actuating the disengagement of the valve 18e from the inlet body 4.

The valve 18e has an effective area that is exposed to the inlet pressure of the inlet body 4. This pressure produces a force that acts on the valve 18e to keep the valve 18e open. The secondary diaphragm 14 has an effective surface area also exposed to the inlet pressure, thereby producing a force acting on the primary diaphragm driving piston 20. In addition, the primary diaphragm 12 has an effective surface area exposed to the outlet pressure, thereby producing a force opposing the force of the secondary diaphragm 14 acting on the primary diaphragm driving piston 20. The opposing forces applied to the primary diaphragm 12 control the flow of fluid through the inlet body 4 and the valve 18e. In this way, the outlet pressure is controlled. In other words, the extent to which the valve 18e is opened is determined by the balance of forces on the valve 18e.

In some embodiments, the primary diaphragm 12 can be held between a pair of protective plates: an upper protective plate 16a and a lower protective plate 16b. Each of the upper and lower protective plates 16a, 16b substantially cover the effective area of the primary diaphragm 12. When the secondary diaphragm 14 is acting on the primary diaphragm driving piston 20, the primary diaphragm driving piston 20 acts on the primary diaphragm 12 by urging against the lower protective plate 16b. This action produces the force for actuating the disengagement of valve 18e from the inlet body 4.

The lower protective plate 16b and the upper protective plate 16a provide increased structural rigidity to the primary diaphragm 12. The protective plates 16a, 16b, help distribute the force applied by the primary diaphragm driving piston 20 over the primary diaphragm 12 and prevent excessive localized force being applied to the primary diaphragm 12.

Additionally, the connection between the valve assembly 18 and the primary diaphragm 12 can be enabled by the upper protective plate 16a. In such embodiments, the upper protective plate 16a can include an upper connector stem 16c protruding into the upper chamber 7 and connecting to the valve assembly 18.

Figure 6:
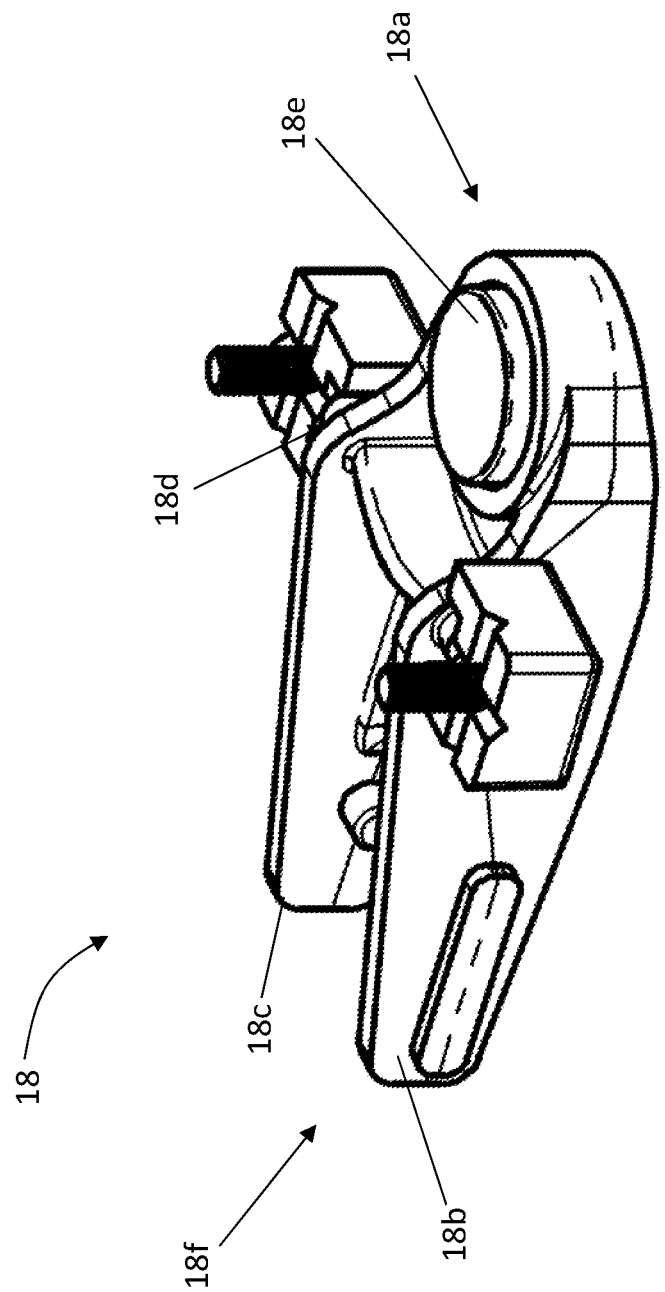
FIG. 6 is an isometric view of the valve assembly 18.

As shown in FIG. 6, the valve assembly 18 can include a first end 18a configured with the valve 18e, a second end 18f configured to be connected to the primary diaphragm 12 (as described in more detail below), and a fulcrum portion 18d provided between the first end 18a and the second end 18f. As shown in FIG. 2, the fulcrum portion 18d can be secured to the upper housing member 2a, whereby the first end 18a and the second end 18f move in a seesaw-like manner about the fulcrum portion 18d for controlling the flow of the fluid from the inlet body 4 to the upper chamber 7.

When the secondary diaphragm 14 is acting on the primary diaphragm driving piston 20, the primary diaphragm driving piston 20 acts on the primary diaphragm 12 and urges the second end 18f of the valve assembly 18 in a first direction, thereby causing the first end 18a of the valve assembly 18 to move in an opposite direction. This movement of the valve assembly 18 actuates engagement of the valve 18e with the inlet 4b. For example, an increase in inlet pressure causes the force applied by the secondary diaphragm 14 on the primary diaphragm driving piston 20 to increase. As a result, the primary diaphragm 12 and the second end 18f of the valve assembly 18 move upward. This causes a downward movement of the first end 18a of the valve assembly 18 disengaging the valve 18e from the inlet 4b and results in increased flow into the upper chamber 7.

Figure 4:
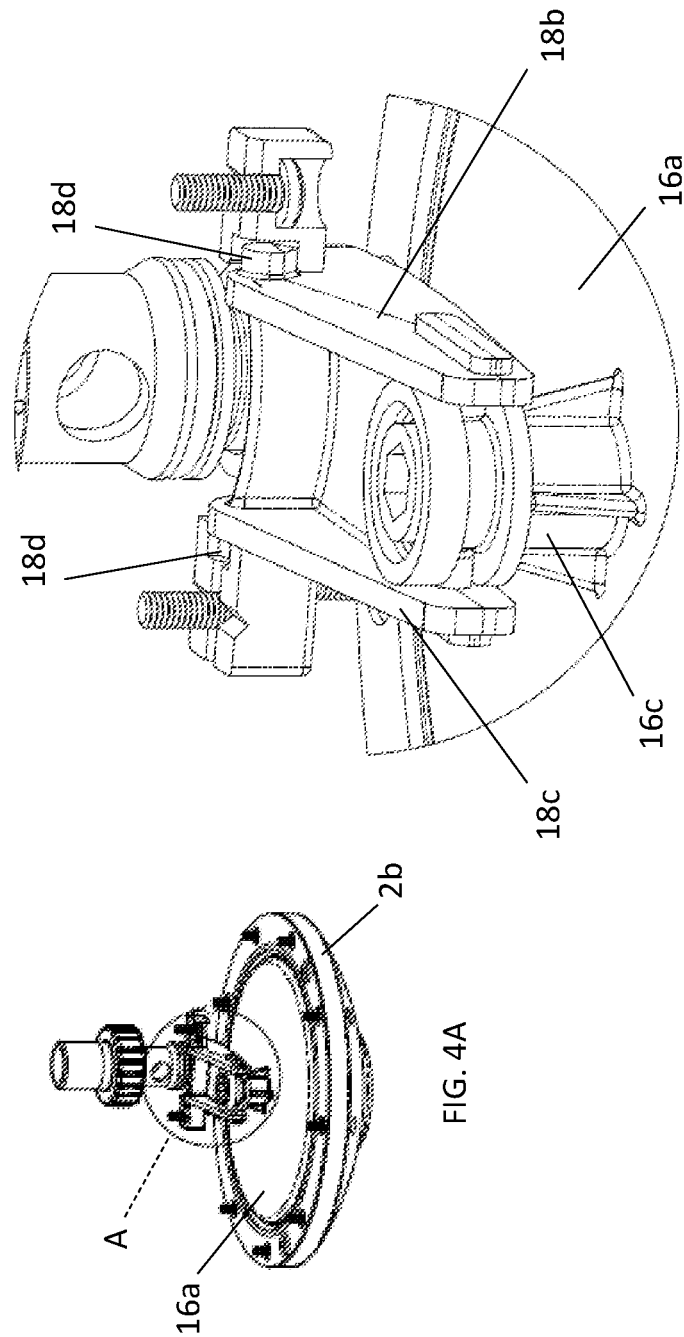
FIG. 4A is a view of the valve assembly 18 connected to the upper connector stem 16c of the upper pressure dispersion plate 16a and engaging the inlet 4b of the inlet body.
FIG. 4B is a detailed view of the region A of FIG. 4A.

The second end 18f of the valve assembly 18 includes a first valve arm 18b and a second valve arm 18c (see FIGS. 4B and 6). Additionally, the upper pressure dispersion plate 16a can include an upper connector stem 16c. The second end 18f of the valve assembly 18 can be connected to the primary diaphragm 12 by the first valve arm 18b. The second valve arm 18c can be coupled to the upper connector stem 16c. FIGS. 4A and 4B show additional detailed views of the valve assembly 18 coupled to the upper connector stem 16c.

In some embodiments, the upper pressure dispersion plate 16a has a lower threaded connector stem 16d extending through the primary diaphragm 12 and the lower pressure dispersion plate 16b. A threaded nut 16e can threadably engage the lower threaded connector stem 16d, thereby securing the lower pressure dispersion plate 16b to the upper pressure dispersion plate 16a while simultaneously securing the primary diaphragm 12 between the upper pressure dispersion plate 16a and the lower pressure dispersion plate 16b.

Optionally, in some embodiments, the upper housing member 2a additionally includes a second inlet body 5 for flushing the upper chamber 7. This flushing action may be used to clean debris from the watering line; to start the flow of medications, vitamins, and other additives into and through the watering line; to rinse the residue left in the watering line after the use of medications, vitamins, and other additives; or to flush out hot or overly warm water and replace it with cooler water. The upper housing member 2a can also comprise the second outlet 9. The first outlet 6 and the second outlet 9 can be provided on opposing sides of the upper housing member 2a.

The pressure regulators of the present disclosure can also include one or more safety mechanisms that prevent the outlet pressure from exceeding a desired value. For example, the pressure regulator can include an internal relief valve that opens in response to an outlet pressure that exceeds a predetermined value. The relief valve can, for example be a spring-loaded device. When open, the relief valve may allow fluid to exit the pressure regulator to ensure that pressures do not exceed safe values.

Figure 5:
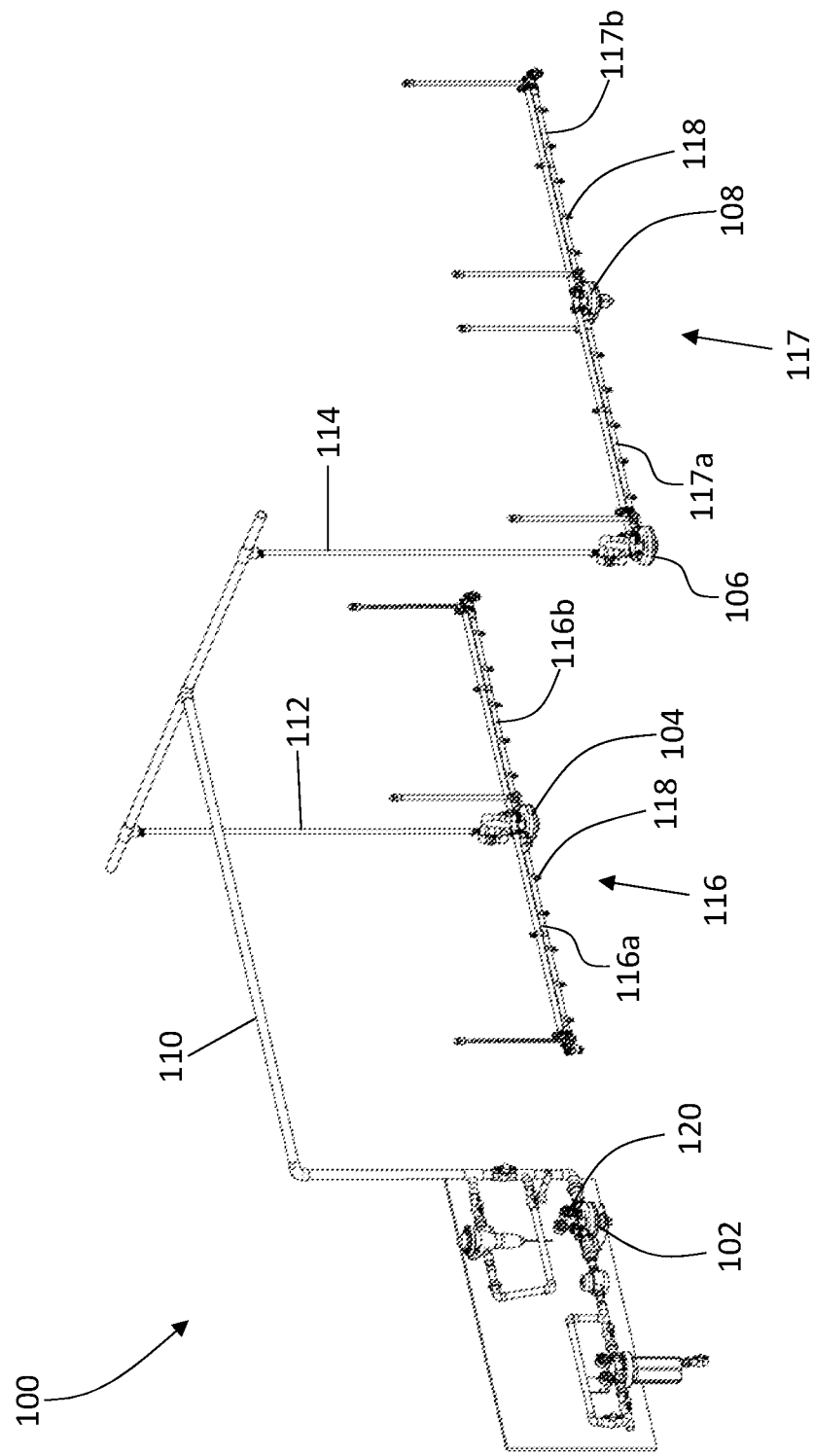
FIG. 5 is view of a livestock watering system according to an embodiment of the present disclosure.

In other embodiments, as shown in FIG. 5, a livestock watering system 100 for delivering a supply of water to poultry or other livestock in a facility such as a barn. The livestock watering system includes a plurality of downstream pressure regulators fluidly coupled to a single water source, such that the inlet water pressure for each of the plurality of downstream pressure regulators is substantially the same. The downstream pressure regulators are configured such that any adjustment of the inlet water pressure from the source results in an adjustment of the outlet pressure of each of the plurality of downstream pressure regulators to a desired pressure that is at a predetermined fraction of the inlet water pressure. In some embodiments, the outlet pressure for each of the plurality of the pressure regulators is substantially equal. In other embodiments, the outlet pressure of one or more of the pressure regulators may be different than that of the others. This may result, for example, if the ratio of the effective areas of the primary diaphragm 12, the secondary diaphragm 14, and the inlet body 4 is not the same in each of the pressure regulators. Such a livestock watering system can be used in a drinker system to reduce a relatively high input pressure to a pressure that is appropriate for delivering water to livestock drinking nozzles.

In the illustrated embodiment, the livestock watering system 100 includes a central pressure regulator 102, piping 110, a plurality of downstream pressure regulators 104, 106 fluidly connected to the central pressure regulator 102 by piping 110, a supplementary pressure regulator 108, and a plurality of drinker lines 116, 117 each having a plurality of drinking nozzles 118. While the livestock watering system 100, as illustrated, includes a first drinker line 116 and a second drinker line 117, it should be understood that the livestock watering system 100 can include any number of drinker lines.

The central pressure regulator 102 is fluidly coupled to an inlet source, such as an unregulated, high pressure fluid source. The central pressure regulator 102 may be any appropriate pressure regulator. For example, the central pressure regulator 102 can be a spring based adjustable pressure regulator. Adjustment of the central pressure regulator 102 adjusts the pressure of the water in piping 110. The piping 110 can further include a pressure indicator 120 for measuring and displaying the inlet pressure (i.e., the water pressure delivered to each downstream pressure regulator). Thus, the inlet pressure of each downstream pressure regulator can be adjusted by an operator positioned at the central pressure regulator 102. This reduces the burden on the operator by eliminating the need to adjust the pressure in each drinker line individually. It should be understood that central pressure regulator 102 can be physically positioned at any location with respect to the livestock watering system 100.

A portion of piping 110 can be elevated above the central pressure regulator 102 and the drinker lines 116, 117. This allows the piping to be in a position in which the piping does not interfere with the passage of animals or humans. In such embodiments, piping 110 can include downpipes 112, 114 that couple the elevated portion of piping 110 with first drinker line 116 and second drinker line 117, respectively.

According to the present disclosure, the downstream pressure regulators can include a first downstream pressure regulator 104 and a second downstream pressure regulator 106. The first and second downstream pressure regulators 104, 106 are pressure regulators 1a and 1, respectively, according to the description above with reference to the embodiments of FIGS. 1-4.

In the embodiment shown, the inlet body of first downstream pressure regulator 104 is connected, directly or indirectly, to the first downpipe 112. Further, a first outlet of first downstream pressure regulator 104 is connected to a first portion 116a of first drinker line 116 and a second outlet of first downstream pressure regulator 104 is connected to a second portion 116b of drinker line 116. In this way, the pressure within both the first portion 116a and the second portion 116b is controlled by a single downstream pressure regulator. Hence, fluid is delivered to nozzles 118 at a pressure that is appropriate for drinking by animals. The first portion 116a and the second portion 116b can be the same or different lengths.

The second downpipe 114 is connected, directly or indirectly, to the inlet body of the second downstream pressure regulator 106, which is positioned at an end of the second drinker line 117. The second downstream pressure regulator 106 has a single output connected to a first portion 117a of the second drinker line 117. The opposite end of the first portion 117a is connected to the supplementary pressure regulator 108. The supplementary pressure regulator 108 is also connected to a second portion 117b of second drinker line 117.

The supplementary regulator 108 can be used in situations where further downstream adjustment of the water pressure is necessary. The supplementary pressure regulator 108 can be any appropriate pressure regulator such as, for example, a spring based adjustable pressure regulator.

It should be understood that the drinker lines can be of any appropriate length. In addition, each drinker line can include any number of downstream pressure regulators and/or supplementary pressure regulators, in any appropriate combination. For example, a plurality of supplementary pressure regulators can be used on a single drinker line. Alternatively, no supplementary pressure regulators may be used.

All patents and published patent applications identified herein are incorporated herein by reference in their entireties.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof.

In addition, numerous variations in the methods/processes described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A pressure regulator for controlling flow of a fluid therethrough, comprising:
    a housing comprising an upper housing member and a lower housing member;
    a primary diaphragm secured between the upper housing member and the lower housing member, wherein the upper housing member and the primary diaphragm defining an upper chamber, and wherein the lower housing member and the primary diaphragm defining a lower chamber;
    the upper housing member comprising an inlet body for allowing the fluid from a fluid source to flow into the upper chamber, and a first outlet for allowing the fluid to flow out of the upper chamber, wherein the inlet body has an inlet in the upper housing;
    a valve assembly provided within the upper chamber configured with a valve engaging the inlet for controlling the flow of the fluid from the inlet body into the upper chamber and connected to the primary diaphragm for actuating the valve's engagement with the inlet,
        wherein when the pressure regulator is in operation, the fluid in the inlet body upstream from the valve is at an inlet pressure, the inlet pressure applying a force acting on the valve to keep the valve open, and the fluid in the upper chamber is at an outlet pressure;
    a secondary diaphragm provided within the lower chamber and defining a secondary diaphragm driving chamber between the secondary diaphragm and the lower housing member within the lower chamber, wherein the secondary diaphragm is configured and adapted for acting on the primary diaphragm and producing a force for actuating the valve's disengagement from the inlet body;
    a passageway connecting the inlet body and the secondary diaphragm driving chamber, wherein the passageway is connected to the inlet body at a point upstream from the valve, thereby providing a fluid communication between the inlet body and the secondary diaphragm driving chamber,
        wherein during operation of the pressure regulator the secondary diaphragm driving chamber is filled with the fluid at the inlet pressure, whereby the secondary diaphragm is subjected to the inlet pressure thereby generating the force for actuating the valve's disengagement from the inlet body; and
        wherein when the fluid is flowing through the upper chamber and out through the first outlet, the outlet pressure is at a value that is a predetermined fraction of the inlet pressure.

2. The pressure regulator of claim 1, further comprising a primary diaphragm driving piston provided within the lower chamber and positioned underneath the primary diaphragm for acting on the primary diaphragm producing the force for actuating the valve's disengagement from the inlet body;
    wherein the secondary diaphragm driving chamber is positioned underneath the primary diaphragm driving piston, wherein the secondary diaphragm is positioned between the primary diaphragm driving piston and the secondary diaphragm driving chamber for acting on the primary diaphragm driving piston to produce the force for actuating the valve's disengagement from the inlet body;
    wherein during operation of the pressure regulator the secondary diaphragm driving chamber is filled with the fluid at the inlet pressure, whereby the secondary diaphragm is subjected to the inlet pressure thereby generating a force acting on the primary diaphragm driving piston which is configured to apply a pressure on the primary diaphragm for producing the force for actuating the valve's disengagement from the inlet body for controlling the flow of the fluid from the inlet body to the upper chamber.

3. The pressure regulator of claim 2, wherein the valve has an effective area that is exposed to the inlet pressure producing the force acting on the valve and keeping the valve open;
    wherein the secondary diaphragm has an effective surface area exposed to the inlet pressure producing the force acting on the primary diaphragm driving piston; and
    wherein the primary diaphragm has an effective surface area exposed to the outlet pressure producing a force opposing the secondary diaphragm's force acting on the primary diaphragm driving piston.

4. The pressure regulator of claim 3, wherein the primary diaphragm is held between an upper pressure dispersion plate and a lower pressure dispersion plate, wherein each of the upper and lower pressure dispersion plates substantially cover the effective area of the primary diaphragm.

5. The pressure regulator of claim 4, wherein when the secondary diaphragm is acting on the primary diaphragm driving piston, the primary diaphragm driving piston acts on the primary diaphragm by urging against the lower pressure dispersion plate producing the force for actuating the valve's disengagement from the inlet body.

6. The pressure regulator of claim 4, wherein the valve assembly is connected to the primary diaphragm by the upper pressure dispersion plate, wherein the upper pressure dispersion plate comprises an upper connector stem protruding into the upper chamber and connecting to the valve assembly.

7. The pressure regulator of claim 4, wherein the upper pressure dispersion plate has a lower threaded connector stem extending through the primary diaphragm and the lower pressure dispersion plate, wherein a threaded nut threadably engages the lower threaded connector stem securing the lower pressure dispersion plate to the upper pressure dispersion plate while simultaneously securing the primary diaphragm between the upper pressure dispersion plate and the lower pressure dispersion plate.

8. The pressure regulator of claim 2, wherein the valve assembly comprises: a first end configured with the valve; a second end connected to the primary diaphragm; and a fulcrum portion provided between the first end and the second end, wherein the fulcrum portion is secured to the upper housing member, whereby the first end and the second end move in a seesaw-like manner about the fulcrum portion for controlling the flow of the fluid from the inlet body to the upper chamber.

9. The pressure regulator of claim 8, whereby when the secondary diaphragm is acting on the primary diaphragm driving piston, the primary diaphragm driving piston acts on the primary diaphragm and urges the second end of the valve assembly in a first direction and causes the first end of the valve assembly to move in an opposite direction actuating the valve's disengagement from the inlet body opening.

10. The pressure regulator of claim 9, wherein the second end of the valve assembly comprising a first valve arm and a second valve arm, wherein the upper pressure dispersion plate comprising an upper connector stem, and the second end is connected to the primary diaphragm by the first valve arm and the second valve arm being coupled to the upper connector stem.

11. The pressure regulator of claim 1, wherein the valve assembly comprises: a first end configured with the valve; a second end connected to the primary diaphragm; and a fulcrum portion provided between the first end and the second end, wherein the fulcrum portion is secured to the upper housing member, whereby the first end and the second end move in a seesaw-like manner about the fulcrum portion for controlling the flow of the fluid from the inlet body to the upper chamber.

12. The pressure regulator of claim 1, wherein the upper housing member further comprising a second inlet body for flushing the upper chamber with the fluid.

13. The pressure regulator of claim 1, wherein the upper housing member further comprising a second outlet.

14. The pressure regulator of claim 13, wherein the first outlet and the second outlet are provided on opposing sides of the upper housing member.

15. The pressure regulator of claim 1, wherein the housing further comprises connecting flanges for removably coupling the pressure regulator to a structure.

16. A livestock watering system comprising:
a central pressure regulator configured to receive a fluid from an external source and regulate the pressure of the fluid to a regulated inlet pressure;
a plurality of drinker lines, each having a plurality of drinker nozzles; and
a plurality of downstream pressure regulators in fluid connection with the central pressure regulator and one of the plurality of drinker lines, wherein each of the downstream pressure regulators comprising:
a housing comprising an upper housing member and a lower housing member;
a primary diaphragm secured between the upper housing member and the lower housing member, wherein the upper housing member and the primary diaphragm defining an upper chamber, and wherein the lower housing member and the primary diaphragm defining a lower chamber;
the upper housing member comprising an inlet body for allowing the fluid from a fluid source to flow into the upper chamber, and a first outlet for allowing the fluid to flow out of the upper chamber, wherein the inlet body has an inlet in the upper housing;
a valve assembly provided within the upper chamber configured with a valve engaging the inlet for controlling the flow of the fluid from the inlet body into the upper chamber and connected to the primary diaphragm for actuating the valve's engagement with the inlet, wherein when the livestock watering system is in operation, the fluid in the inlet body upstream from the valve is at the inlet pressure, the inlet pressure applying a force acting on the valve to keep the valve open, and the fluid in the upper chamber is at an outlet pressure;
a secondary diaphragm provided within the lower chamber and defining a secondary diaphragm driving chamber between the secondary diaphragm and the lower housing member within the lower chamber, wherein the secondary diaphragm is configured and adapted for acting on the primary diaphragm and producing a force for actuating the valve's disengagement from the inlet body;
a passageway connecting the inlet body and the secondary diaphragm driving chamber, wherein the passageway is connected to the inlet body at a point upstream from the valve, thereby providing a fluid communication between the inlet body and the secondary diaphragm driving chamber,
wherein during operation of the livestock watering system the secondary diaphragm driving chamber is filled with the fluid at the inlet pressure, whereby the secondary diaphragm is subjected to the inlet pressure thereby generating the force for actuating the valve's disengagement from the inlet body; and
wherein when the fluid is flowing through the upper chamber and out through the first outlet, the outlet pressure is at a value that is a predetermined fraction of the inlet pressure.

17. The livestock watering system of claim 16, wherein each of the plurality of downstream pressure regulators further comprises a primary diaphragm driving piston provided within the lower chamber and positioned underneath the primary diaphragm for acting on the primary diaphragm producing the force for actuating the valve's disengagement from the inlet body;
wherein the secondary diaphragm driving chamber is positioned underneath the primary diaphragm driving piston, wherein the secondary diaphragm is positioned between the primary diaphragm driving piston and the secondary diaphragm driving chamber for acting on the primary diaphragm driving piston to produce the force for actuating the valve's disengagement from the inlet body;
wherein during operation of the livestock watering system the secondary diaphragm driving chamber is filled with the fluid at the inlet pressure, whereby the secondary diaphragm is subjected to the inlet pressure thereby generating a force acting on the primary diaphragm driving piston which is configured to apply a pressure on the primary diaphragm for producing the force for actuating the valve's disengagement from the inlet body for controlling the flow of the fluid from the inlet body to the upper chamber.

18. The livestock watering system of claim 17, wherein the valve has an effective area that is exposed to the inlet pressure producing the force acting on the valve and keeping the valve open;
wherein the secondary diaphragm has an effective surface area exposed to the inlet pressure producing the force acting on the primary diaphragm driving piston; and
wherein the primary diaphragm has an effective surface area exposed to the outlet pressure producing a force opposing the secondary diaphragm's force acting on the primary diaphragm driving piston.

19. The livestock watering system of claim 18, wherein the primary diaphragm is held between an upper pressure dispersion plate and a lower pressure dispersion plate, wherein each of the upper and lower pressure dispersion plates substantially cover the effective area of the primary diaphragm, and wherein when the secondary diaphragm is acting on the primary diaphragm driving piston, the primary diaphragm driving piston acts on the primary diaphragm by urging against the lower pressure dispersion plate producing the force for actuating the valve's disengagement from the inlet body.

20. The livestock watering system of claim 16, wherein the valve assembly comprises: a first end configured with the valve; a second end connected to the primary diaphragm; and a fulcrum portion provided between the first end and the second end, wherein the fulcrum portion is secured to the upper housing member, whereby the first end and the second end move in a seesaw-like manner about the fulcrum portion for controlling the flow of the fluid from the inlet body to the upper chamber.

* * * * *